March 17, 1925.  1,529,791
C. JABLOW
CENTER PIN FOR LOCOMOTIVES
Filed Sept. 27, 1922
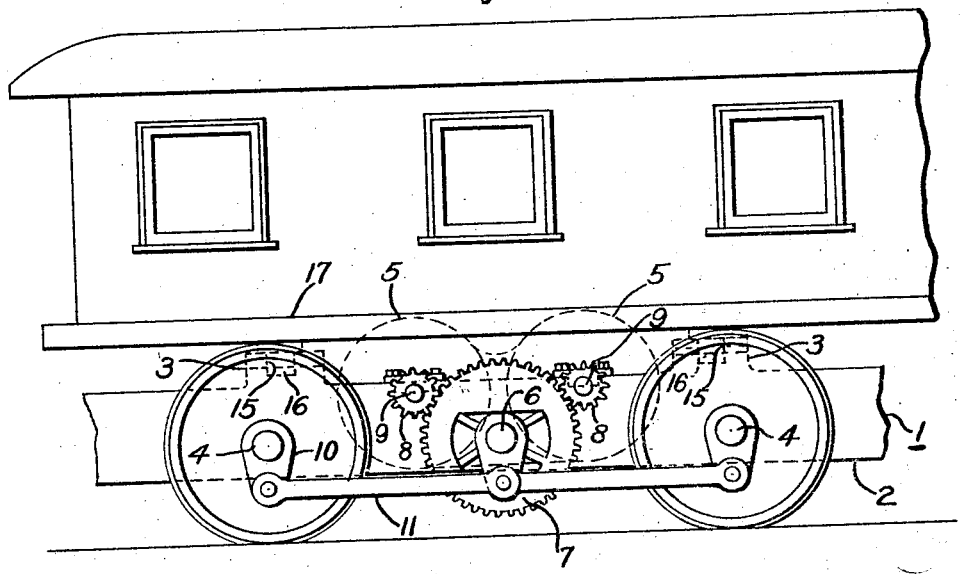
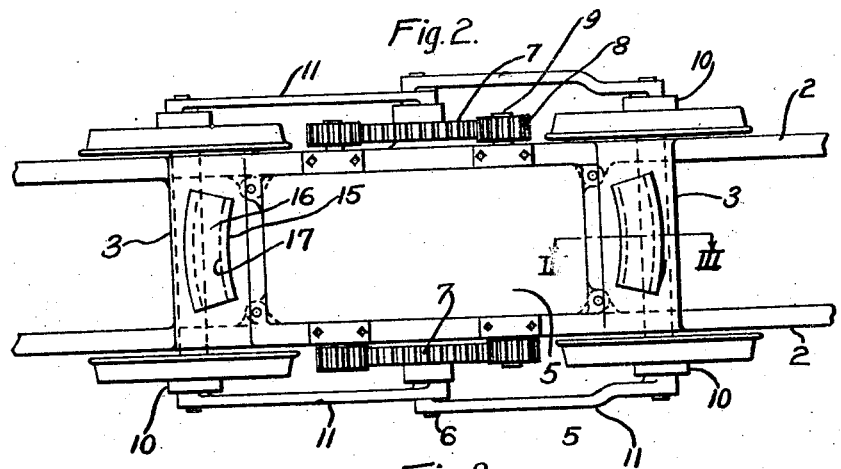
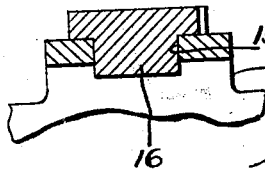
WITNESSES:
INVENTOR
Charles Jablow.
BY
ATTORNEY Patented Mar. 17, 1925.

1,529,791

UNITED STATES PATENT OFFICE.

CHARLES JABLOW, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CENTER PIN FOR LOCOMOTIVES.

Application filed September 27, 1922. Serial No. 590,807.

*To all whom it may concern:*

Be it known that I, CHARLES JABLOW, a citizen of the United States, and a resident of East Pittsburgh, in the county of Allegheny and State of Pennsylvania, have invented a new and useful Improvement in Center Pins for Locomotives, of which the following is a specification.

My invention relates to electric-locomotive truck supports, more especially to a means for connecting the locomotive body to said trucks.

It is among the objects of this invention to provide a cab-support structure which facilitates the distribution of loading at the desired frame portion of the truck, irrespective of the point of contact between the truck and cab and which shall provide lateral and longitudinal stability of the cab.

It is a further object of this invention to provide such a structure which shall be of relatively simple design and readily adapted to standard locomotive trucks.

Heretofore, locomotive cabs or bodies were supported on their respective trucks by suitable center bearings comprising a plurality of co-operating center plates disposed transversely to the side frames and having a center-pin connection therebetween to facilitate pivotal movement thereof. The location of these center-bearing supports was essentially in proximity to that portion of the truck which is designed to carry the major load.

On certain types of locomotives, the center of the driving mechanism is usually that part taken up by the motors and jackshaft which interfere with a center-bearing mounting at this point.

My present invention is directed to means for providing pivotal movement or swiveling of the supporting truck at a point centrally located with reference to the driving mechanism or motors without encountering the interference of such drive mechanism with respect to the bearing supports of the cab and truck. I accomplish this by, in effect, expanding the center bearing by splitting and spreading it on the respective sides of the drive mechanism.

In the accompanying drawing constituting a part hereof and in which like reference characters designate like parts, Fig. 1 is a side elevational view of an electric locomotive embodying the principles of my invention;

Fig. 2 is a plan view of the supporting truck thereof, and

Fig. 3 is a cross-sectional view of the bearing support taken along the line III—III of Fig. 2.

Referring to Fig. 1, the locomotive comprises a supporting truck 1 having a plurality of side frames 2 provided with suitable cross-ties 3 and journaled upon a plurality of wheeled driving axles 4. A pair of motors 5 are supported on the side frames 2, and a jackshaft 6 is journaled in said frames in central alinement with the motors 5 and is connected therewith through a pair of gears 7 meshing with a plurality of motor pinions 8 mounted on the ends of their armature shafts 9. The jackshaft is connected to the driving axles 4 by the usual cranks and connecting rods 10 and 11, respectively. The cross-ties 3 are provided with arcuate guide-ways 15 adapted to receive correspondingly shaped guide tongues 16 secured to the cab sub-frame 17. The arcuate guide-ways and tongues may be symmetrically disposed with respect to the center line of the jackshaft which is the center of the drive mechanism.

The guides so constituted function as a single center pin centrally located in the drive mechanism and permit of swivel movement of the truck with respect to the cab frame 17 without interference with the driving mechanism, as in structures heretofore employed. Another advantage of the split bearings is that they provide a larger area of contact or support between the truck and cab members giving lateral and longitudinal stability to the cab or locomotive body. Thus, it is possible to eliminate the usual side bearings.

Although I have described a specific embodiment of my invention, it will be obvious to those skilled in the art that various modifications may be made in the details of construction thereof. For instance, the center-bearing support may constitute an annular guideway disposed around the driving motors instead of the segmental guides illustrated. The guide and tongue may be reversed to constitute parts of the cab and truck, respectively, and this general scheme of center-bearing mounting may be applied to other types of drives where the motor is geared directly to the driving axles. These and other changes may be made in my invention without departing from the principles herein set forth.

I claim as my invention:

1. An electric-locomotive center-bearing support comprising a pair of segmental guides disposed on cross members between the frames of the supporting trucks and secured to the truck and cab.

2. An electric-locomotive center-bearing support comprising segmental guides disposed on the respective sides of the drive mechanism and secured on cross members of the truck between the side frames thereof.

3. An electric-locomotive center-bearing support comprising segmental guide-ways secured on cross members between the side frames of the supporting trucks on the respective sides of the drive mechanism and a pair of guide tongues secured to the cab sub-frame in co-operative engagement with said ways.

4. An electric-locomotive center-bearing support comprising segmentary guide-ways secured on cross members between the side frames of the supporting trucks on the respective sides of the drive mechanism and a pair of angular guide tongues secured to the cab sub-frame in co-operative engagement with said ways.

5. An electric-locomotive center-bearing support comprising a pair of segmentary guide bearings symmetrically disposed on the respective sides of the drive mechanism and secured on cross members to the truck and the cab between the side frames of said truck.

In testimony whereof, I have hereunto subscribed my name this 12th day of September, 1922.

CHARLES JABLOW.